United States Patent
Woodruff et al.

(10) Patent No.: US 11,926,135 B2
(45) Date of Patent: Mar. 12, 2024

(54) WRAPPABLE LAMINATED TEXTILE SLEEVE WITH ENHANCED FLEXIBILITY AND METHOD OF REDUCING CRACKING IN A FOIL LAYER OF A WRAPPABLE TEXTILE SLEEVE

(71) Applicant: Federal-Mogul Powertrain, LLC, Southfield, MI (US)

(72) Inventors: Alexa Woodruff, Bryn Mawr, PA (US); Cassie M. Malloy, Trappe, PA (US); David A. Harris, Glenmoore, PA (US); Aleksandr Ilyin, Chester Springs, PA (US)

(73) Assignee: Federal-Mogul Powertrain, Inc., Southfield, MI (US)

( * ) Notice: Subject to any disclaimer, the term of this patent is extended or adjusted under 35 U.S.C. 154(b) by 590 days.

(21) Appl. No.: 15/943,201

(22) Filed: Apr. 2, 2018

(65) Prior Publication Data

US 2018/0222144 A1    Aug. 9, 2018

Related U.S. Application Data

(62) Division of application No. 14/043,663, filed on Oct. 1, 2013, now abandoned.

(51) Int. Cl.
*B32B 5/02* (2006.01)
*B32B 1/08* (2006.01)
(Continued)

(52) U.S. Cl.
CPC ............. *B32B 5/024* (2013.01); *B32B 1/08* (2013.01); *B32B 5/24* (2013.01); *B32B 37/00* (2013.01);
(Continued)

(58) Field of Classification Search
CPC .. B32B 5/024; B32B 5/24; B32B 1/08; B32B 37/00; B32B 7/12; B32B 15/08;
(Continued)

(56) References Cited

U.S. PATENT DOCUMENTS 3,408,453 A * 10/1968 Shelton, Jr. ............ H01B 7/285
                                                                174/258
3,816,643 A *  6/1974 Pechhold ............... H01B 13/14
                                                                174/107
(Continued)

FOREIGN PATENT DOCUMENTS

JP     2000340186 A    12/2000
JP     2001522950 A    11/2001
(Continued)

OTHER PUBLICATIONS

Sima International, AL/PET Tape (Aluminum Mylar Tape), http://simaintl.com/store/aluminum_mylar_PET_tape.html (2008). (Year: 2008).*

(Continued)

*Primary Examiner* — Christopher W Raimund
(74) *Attorney, Agent, or Firm* — Robert L. Stearns; Dickinson Wright PLLC

(57) ABSTRACT

A wrappable textile sleeve and method of reducing cracking in a foil layer of a wrappable textile sleeve are provided. The sleeve includes an elongate wall extending along a longitudinal axis between opposite ends with lengthwise extending edges extending along the longitudinal axis between the opposite ends. The wall includes a textile layer, a polymeric film layer fixed to the inner textile layer and a metal foil layer fixed to the polymeric film layer. The polymeric film layer has a first thickness and the metal foil layer has a second thickness, wherein the second thickness is greater than the first thickness.

8 Claims, 2 Drawing Sheets

(51) Int. Cl.
  *B32B 5/24* (2006.01)
  *B32B 37/00* (2006.01)
  *D03D 15/43* (2021.01)
  *H02G 3/04* (2006.01)

(52) U.S. Cl.
  CPC ........... *D03D 15/43* (2021.01); *H02G 3/0481* (2013.01); *D10B 2401/041* (2013.01); *Y10T 156/10* (2015.01); *Y10T 428/2495* (2015.01)

(58) Field of Classification Search
  CPC ......... B32B 15/20; B32B 27/12; B32B 27/36; B32B 2311/24; B32B 2367/00; B32B 3/12; D03D 15/0094; D03D 15/00; H02G 3/0481; D10B 2401/041; Y10T 428/2495; Y10T 156/10
  See application file for complete search history.

(56) References Cited

U.S. PATENT DOCUMENTS

| | | | | |
|---|---|---|---|---|
| 3,826,862 | A | * | 7/1974 | Ichiba ..................... B32B 15/08 174/102 R |
| 5,023,395 | A | * | 6/1991 | O'Connor ............... B32B 15/08 174/36 |
| 5,843,542 | A | | 12/1998 | Brushafer et al. |
| 5,916,652 | A | * | 6/1999 | Miner ...................... B32B 7/06 428/41.8 |
| 6,374,862 | B1 | | 4/2002 | Schwert |
| 2003/0024850 | A1 | | 2/2003 | Synder |
| 2004/0126600 | A1 | * | 7/2004 | Dunbar ................ H05K 1/0346 428/473.5 |
| 2004/0219846 | A1 | | 11/2004 | Sellis et al. |
| 2006/0016507 | A1 | | 1/2006 | Baer |
| 2007/0166495 | A1 | * | 7/2007 | Sellis ....................... B32B 5/26 428/36.1 |
| 2009/0218002 | A1 | | 9/2009 | Kashihara |
| 2012/0118356 | A1 | * | 5/2012 | Albright ................ B32B 15/08 136/251 |

FOREIGN PATENT DOCUMENTS

| | | |
|---|---|---|
| JP | 2004537441 A | 12/2004 |
| JP | 2007501750 A | 2/2007 |
| JP | 2011046840 A | 3/2011 |
| JP | 2012148560 A | 8/2012 |
| WO | 0025057 A1 | 5/2000 |
| WO | 2012024272 A1 | 2/2012 |

OTHER PUBLICATIONS

Nexolve, CPI Polyimide, Nexolve Materials, http://www.nexolvematerials.com/low-cure-polyimides/cp1-polyimide, Jul. 11, 2013 (Year: 2013).*
International Search Report, dated Dec. 10, 2014 (PCT/US2014/058534).

* cited by examiner

_WRAPPABLE LAMINATED TEXTILE SLEEVE WITH ENHANCED FLEXIBILITY AND METHOD OF REDUCING CRACKING IN A FOIL LAYER OF A WRAPPABLE TEXTILE SLEEVE_

CROSS REFERENCE TO RELATED APPLICATION

This divisional application claims priority to U.S. application Ser. No. 14/043,663, filed Oct. 1, 2013, which is incorporated herein by reference in its entirety.

BACKGROUND OF THE INVENTION

1. Technical Field

This invention relates generally to protective textile sleeves for protecting elongate members, and more particularly, to wrappable textile sleeves having an outer foil layer.

2. Related Art

It is known to utilize textile sleeves to protect elongate members from a variety of external environmental conditions, including braided, knit or woven textile structures. It is further known to form the sleeve having wrappable walls. With wrappable walls, it is further known to utilized closure tape to maintain opposite lengthwise extending edges of the wall in secured, overlapped relation with one another. In some applications it is desirable to have the elongate members contained within the sleeve against thermal environmental conditions, such as high heat, for example. In these applications, it is known to provide the textile sleeve with an outer reflective foil layer, and further, to provide the closure tape having a reflective outer foil layer. Typically the foil layers of the sleeve and closure tape are adhered to an outer surface of the textile sleeve wall and to an outer surface of the foil layer of the sleeve wall, respectively.

Unfortunately, in use, when the sleeve wall and closure tape are exposed to high heat, such as in an automotive exhaust pipe application, the foil layer of the sleeve wall can be prone to cracking. Cracking has been found to be particularly troubling in the region of the closure tape. If the foil layer of the sleeve wall becomes cracked, the useful life of the sleeve is generally diminished, and can also be unsightly.

SUMMARY OF THE INVENTION

In accordance with one aspect of the invention, a wrappable textile sleeve is provided. The sleeve includes an elongate wall extending along a longitudinal axis between opposite ends with lengthwise extending edges extending along the longitudinal axis between the opposite ends. The wall includes a textile layer, a polymeric film layer fixed to the inner textile layer and a metal foil layer fixed to the polymeric film layer. The polymeric film layer has a first thickness and the metal foil layer has a second thickness, wherein the second thickness is greater than the first thickness.

In accordance with another aspect of the invention, the first thickness is between about 0.0001 inches and 0.0004 inches and the second thickness is between about 0.00035 inches and 0.0010 inches.

In accordance with another aspect of the invention, the first thickness is between about 0.0002 inches and 0.0003 inches and the second thickness is between about 0.0005 inches and 0.0009 inches.

In accordance with another aspect of the invention, the metal foil layer is soft aluminum.

In accordance with another aspect of the invention, the polymer film is a preshrunk polymer film.

In accordance with another aspect of the invention, the polymer film is polyethylene terephthalate.

In accordance with another aspect of the invention, the polymer film layer and the metal foil layer are bonded together by an adhesive.

In accordance with another aspect of the invention, the polymer film layer is bonded to the textile layer by an adhesive.

In accordance with another aspect of the invention, the textile layer has interlaced filaments.

In accordance with another aspect of the invention, the textile layer is woven.

In accordance with another aspect of the invention, the textile layer has a plurality of discrete circumferentially extending annular bands formed from circumferentially extending weft yarns with adjacent bands having weft yarns with different diameters from one another.

In accordance with another aspect of the invention, the first thickness is between about 0.0001 inches and 0.0003 inches and the second thickness is between about 0.00035 inches and 0.0010 inches.

In accordance with another aspect of the invention, the sleeve includes a closure tape having a woven scrim and a metal foil scrim bonded to one another. The woven scrim has a side facing away from the metal foil scrim with an adhesive thereon for attachment to the metal foil layer of the sleeve wall.

In accordance with another aspect of the invention, a method of reducing cracking in a foil layer of a wrappable textile sleeve is provided. The method includes providing a textile layer; providing a polymeric film layer having a first thickness; providing a metal foil layer having a second thickness and a polymeric film layer with one another; bonding the polymeric film layer to the textile layer; bonding the metal foil layer to the polymeric film layer; and providing the second thickness of the metal foil layer with a greater thickness than the first thickness of the polymeric film layer.

In accordance with another aspect of the invention, the method further includes providing the first thickness of the polymeric film layer between about 0.0001 inches and 0.0004 inches and providing the second thickness of the foil layer between about 0.00035 inches and 0.0010 inches.

In accordance with another aspect of the invention, the method further includes providing the metal foil layer as soft aluminum.

In accordance with another aspect of the invention, the method further includes providing the polymer film as a preshrunk polymer film.

In accordance with another aspect of the invention, the method further includes providing the textile layer as a woven layer.

In accordance with another aspect of the invention, the method further includes providing the textile layer having a plurality of discrete circumferentially extending annular bands formed from circumferentially extending weft yarns with adjacent bands having weft yarns with different diameters from one another.

BRIEF DESCRIPTION OF THE DRAWINGS

These and other aspects, features and advantages of the present invention will become more readily appreciated when considered in connection with the following detailed description of presently preferred embodiments and best mode, appended claims and accompanying drawings, in which:

DETAILED DESCRIPTION OF PRESENTLY PREFERRED EMBODIMENTS

Figure 1:
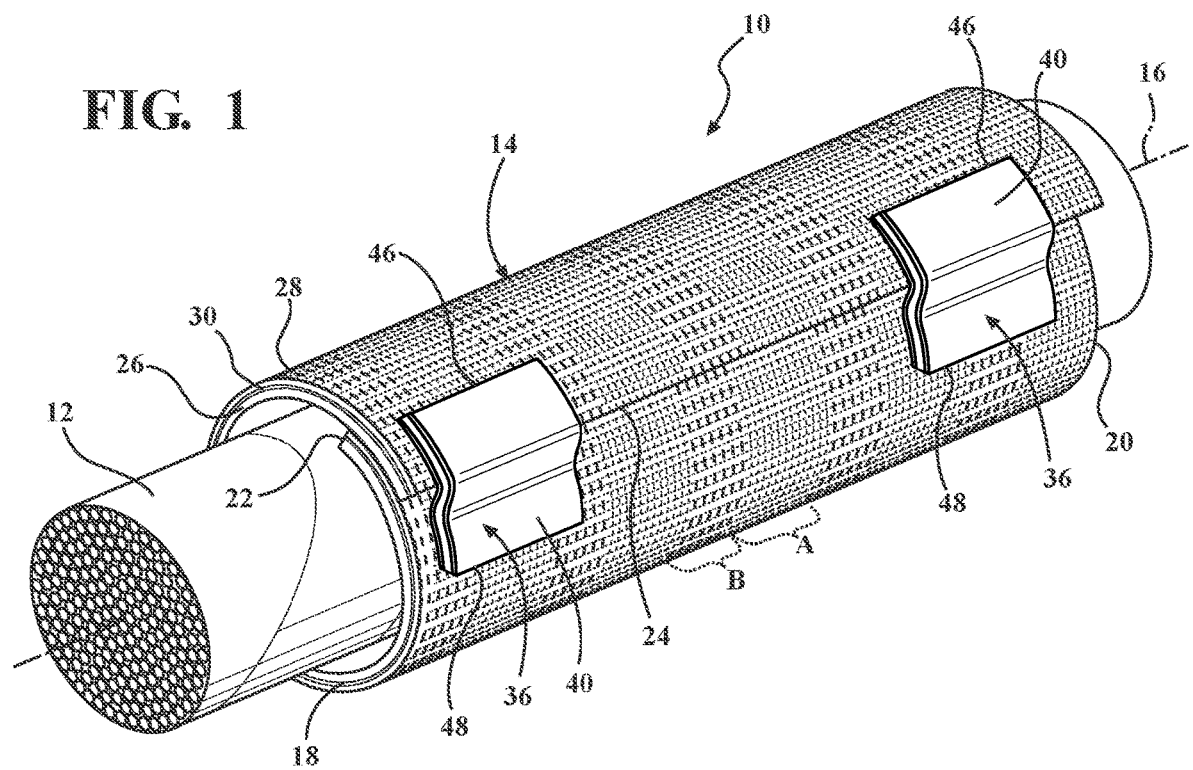
FIG. 1 is a perspective view of a wrappable textile sleeve constructed in accordance with one aspect of the invention shown wrapped about an elongate member.
Figure 2:
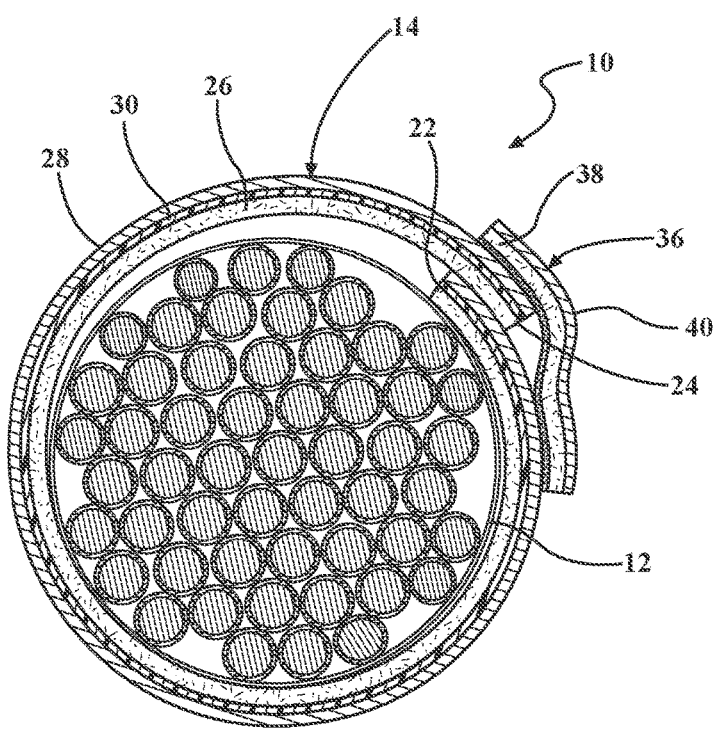
FIG. 2 is an enlarged cross-sectional view of the textile sleeve of FIG. 1.
Figure 3:
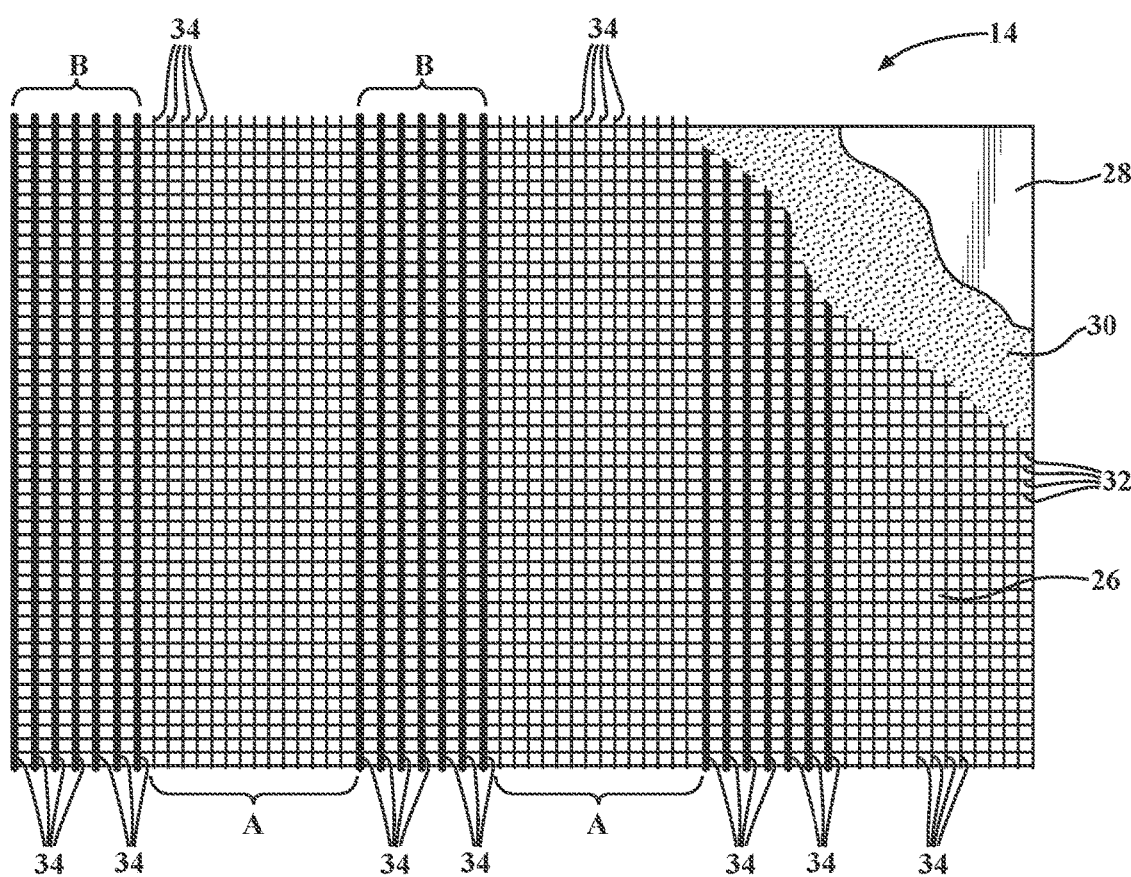
FIG. 3 is a partially broken away plan view of a flattened wall of the textile sleeve of FIG. 1.
Figure 4:
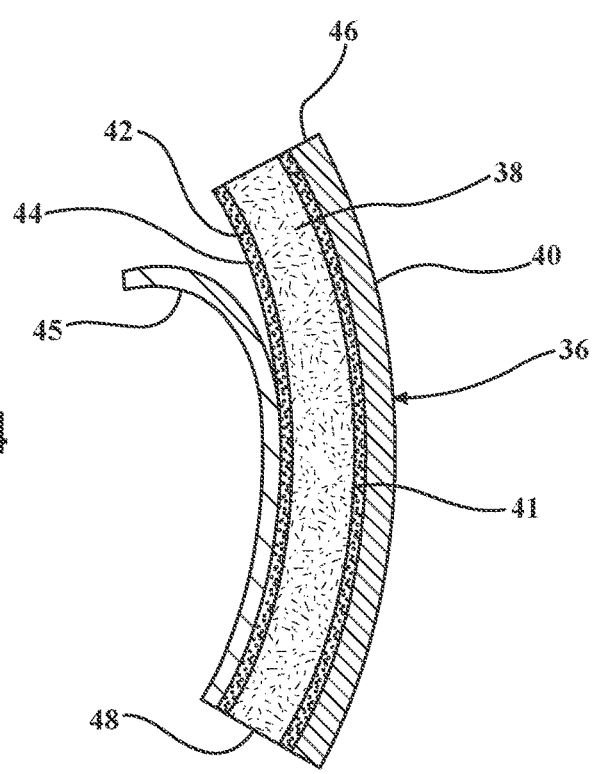
FIG. 4 is an enlarged cross-sectional view of a closure tape of the textile sleeve of FIG. 1.

Referring in more detail to the drawings, FIG. 1 illustrates a wrappable textile sleeve 10 constructed in accordance with one aspect of the invention wrapped about an elongate member 12 (e.g. flexible wire harness or other flexible member) to be protected. The sleeve 10 has an elongate wall 14 that extends along a longitudinal axis 16 between opposite ends 18, 20 with lengthwise extending edges 22, 24 extending along the longitudinal axis 16 between the opposite ends 18, 20. The wall 14 includes an inner textile layer 26, an outer reflective layer, such a metal layer of aluminum 28, and an intermediate polymer film layer 30 sandwiched between the inner and outer layers 26, 28. The film layer 30 has a first thickness and is fixed to the textile layer 26, and the metal foil layer 28 has a second thickness and is fixed to the polymer film layer 30. The second thickness of the foil layer 28 is greater than the first thickness of the film layer 30, which has been discovered to provide an optimal performance of the sleeve 10, particularly when being routed about bends and around corners. With the film layer 30 having a reduced thickness relative to the foil layer 28, the wall 14 is able to retain a relatively smooth arc, and not kink, and further, the foil layer 28 is inhibited from cracking, and as such, the performance and useful life of the sleeve 10 is enhanced. One theory for this phenomenon is attributed to the reduced contribution of the film layer 30 from hardening and causing the foil layer from kinking and cracking, particularly at high temperatures, such as those encountered within an engine compartment or near an exhaust system, by way of example and without limitation.

The textile layer 26 can be woven, knit or braided, and is preferably woven from at least one lengthwise extending warp yarn 32 and a plurality of circumferentially extending weft yarns 34. The weft yarns 34 can be woven to form a plurality of discrete annular bands A, B extending and alternating in adjacent relation with one another along the longitudinal axis 16 with immediately adjacent bands A, B having weft yarns with different diameters from one another. As shown, the bands A are woven from weft yarns 34 having a first diameter and the bands B are woven from weft yarns 34 having a second diameter, wherein the first and second diameters are different from one another, represented as the first diameter being smaller than the second diameter. As such, the textile layer 26 is formed having varying physical properties along the length of the sleeve 10 due to the different diameters of the weft yarns 28 in the bands A, B. The bands A, having the very fine diameter monofilament weft yarns 34, provide the sleeve 10 with enhanced flex regions that result in an enhanced ability of the sleeve 10 to flex and bend around corners, including corners of 90 degrees or more, without kinking and without forming openings or gaps between the overlapping edges 22, 24. Meanwhile, the bands B, having the larger diameter monofilament weft yarns 34, such as between about 0.38 and 0.48 mm, and provide the sleeve 10 with stiff, rigid regions relative to the bands A, thereby providing the wall 14 with enhanced hoop strength to prevent the wall 14 from being flattened or crushed. As such, the elongate member 12 contained within the sleeve 10 is protected against damage from being crushed.

The weft yarns 34 are provided as monofilament yarn within both bands A, B, and can be provided at least in part as heat-settable monofilament yarn, if desired to heat-set the wall 14 into a thermally formed, self-wrapping wall, or other polymeric and/or mineral fiber yarn, depending on the application. The alternating bands A, B, as discussed above, have differently sized monofilaments, thereby providing the sleeve with increased flex bands A and increased hoop strength bands B. In accordance with one aspect of the invention, the weft yarns 28 in the flexible bands A are about ⅓ the diameter of the weft yarns 28 in the more rigid bands B. Accordingly, a ratio of about 3:1 in weft yarn diameters for the relative bands B, A has been found to provide the sleeve 10 with excellent bending and crush strength performance. The bands A, B are sized in axially extending widths relative with one another to provide the desired amount of flex and hoop strength, while at the same time preventing the wall 14 from kinking and forming openings/gaps along the seam between the overlapping edges 22, 24. If the relative widths between the bands A, B is not maintained, the wall 14 can either sacrifice the needed hoops strength, such as if the bands A are too wide relative to the bands B, or the wall can be too stiff and inflexible, thereby kinking and forming openings/gaps along the seam between the edges 22, 24, such as if the bands B are too wide relative to the bands A. Accordingly, it should be recognized that a balance needs to be maintained between the respective widths of the bands A, B to provide the sleeve 10 with the ability to flex without kinking and forming openings/gaps, while also retaining the desired hoop strength without being too stiff.

The warp yarn 32 can be provided of any suitable yarn material, including monofilament or multifilament yarn, and in any suitable number of ends. Preferably the warp yarn 32 is provided at least in part of multifilament yarn to enhance the coverage protection provided by the wall 14 to the enclosed elongate member 12. The density of the warp yarn 32 has an influence on the flexibility of the sleeve wall 14, and as such, it has been discovered that a reduced warp density of about 14 ends per inch is optimal to provide the sleeve wall 14 with the flexibility desired, though the warp density could be increased if optimal flexibility is unnecessary.

The foil layer 30 is provided as a flexible layer, and preferably from dead soft aluminum (aluminum that is annealed, such as at about 600 degrees Fahrenheit, to reduce strength and hardness). Other types of foil and grades of foil have been tested, however, they were found to be too stiff and to have too little elongation, thereby being more prone to tearing and cracking. The thickness of the foil layer 30 is between about 0.00035 inches and 0.0010 inches.

The film layer 30 is provided as an impervious polymeric layer, such as from preshrunk polyethylene terephthalate (PET). By being preshrunk, further shrinkage in use is minimized, thereby reducing the likelihood of delamination from the textile and foil layers 26, 28. The film layer 30 is provided having a thickness ranging between about 0.0001 inches and 0.0004 inches.

In one presently preferred construction of the sleeve 10, the textile layer 26 was formed having alternating bands A, B in a weaving process, as discussed above. Further, a lamination of the foil layer 28 and the film layer 30 was formed by adhering the two layers 28, 30 to one another via an adhesive that is able to withstand high temperatures without delaminating. In several tests to determine optimal strength and flexibility of the sleeve 10, the film layer 30 was provided having a constant thickness, while the thickness of the foil layer 28 was varied between 0.000035 inches to 0.001 inches. Upon completion of the testing, an optimal thickness of the foil layer 28 was found to be about 0.0007 inches, wherein the number of cracks formed in the foil layer 28 upon being bent decreased as the thickness of the foil layer 28 was increased, however, at a thickness greater than 0.001 inches, the flexibility of the sleeve 10 was significantly reduced. Further testing was performed using a constant thickness foil layer 28, and the thickness of the film layer 30 was varied between 0.00025 inches to 0.002 inches. During this testing, it was found that an optimal thickness of the film layer 30 was found to be about 0.00025 inches, and when the film layer 30 increased in thickness, the number of cracks in the foil layer 28 increased as a result of the film layer 30 becoming increasingly brittle with increased thickness. This said, a sample with no film layer 30 was tested, and it performed poorly, as the foil layer 28 was unsupported and thus, was subject to tearing easily.

In accordance with another aspect of the invention, a closure tape 36 is provided to maintain the opposite edges 22, 24 of the sleeve wall 12 in overlapped, closed relation with one another. The closure tape 36 has a high temperature textile lattice, also referred to as scrim 38, such as a woven, knit or braided layer 38, and a metal foil layer 40, having a thickness equal to or substantially equal to that of the foil layer 28 on the sleeve 10, bonded to one another via an adhesive 41. The woven scrim 38 has a side 42 facing away from the metal foil layer 40 with an adhesive 44 thereon for bonded attachment to the metal foil layer 28 of the sleeve 10. To enable the closure tape 36 to remain unused, a release paper 45 can be applied over the adhesive 44 until it is desired to uncover the adhesive 44 for use. Of course, one end 46 of the closure tape 36 can be adhered to the foil layer 28 of the sleeve 10 during manufacture of the sleeve 10, with the release paper remaining on the exposed, unbonded portion of the adhesive layer 44 adjacent an opposite end 48 until it is desired to wrap the sleeve wall 14 about the elongate member 12 and fix the opposite ends 18, 20 of the sleeve wall 14 in overlapped relation with one another.

The metal foil layer 40 of the closure tape 36 functions to provide a reflective foil covering about the entirety of the sleeve 10, and to prevent heat from affecting the ability of the adhesive 44 of the closure tape 36 from remaining adhered to the metal foil layer 28 of the sleeve wall 14. The textile scrim 38 of the closure tape 36 can be woven, knit or braided from any suitable high temperature yarn, including basalt, silica, fiberglass and the like. Further, the closure tape 36 can be formed having any suitable length sufficient to be adhered to the opposite edges 22, 24 of the wall 14, but is generally provided having a length equal to about ⅓ to ½ the wrapped outer circumference of the sleeve 10. With the closure tape 36 having the textile scrim 38, as compared to that of a polymeric film layer, the flexibility and crack resistance of the sleeve wall 14 is optimized. Testing has found that the flexibility and crack resistance to be nearly doubled for the textile scrim containing closure tape 36 compared to that of a closure tape including a polymeric scrim layer. The reason attributed to this is based largely on the elimination of the polymeric film that has been found to contribute to a diminished flexibility and crack resistance as a result of hardening when exposed to heat.

Many modifications and variations of the present invention are possible in light of the above teachings. It is, therefore, to be understood that the invention may be practiced otherwise than as specifically described, and that the scope of the invention is defined by any ultimately allowed claims.

What is claimed is:

1. A method of reducing cracking in a foil layer of a wrappable textile sleeve, comprising:
   providing a textile layer;
   providing a preshrunk polymeric film layer having a first thickness between about 0.0001 inches and 0.00025 inches;
   providing a metal foil layer having a second thickness between about 0.00035 inches and 0.0010 inches;
   bonding the preshrunk polymeric film layer directly to the textile layer; and
   bonding the metal foil layer directly to the preshrunk polymeric film layer, wherein the textile layer forms an inner layer of the wrappable textile sleeve and the metal foil layer forms an outer layer of the wrappable textile sleeve.

2. The method of claim 1 further including providing the metal foil layer as soft aluminum.

3. The method of claim 1 further including providing the textile layer as a woven layer.

4. The method of claim 3 further including providing the textile layer having a plurality of discrete circumferentially extending annular bands formed from circumferentially extending weft yarns with adjacent bands having weft yarns with different diameters from one another.

5. A method of reducing cracking in a foil layer of a wrappable textile sleeve, consisting of:
   providing a textile layer;
   providing a polymeric film layer having a first thickness between about 0.0001 inches and 0.00025 inches;
   providing a dead soft metal foil layer having a second thickness between about 0.00035 inches and 0.0010 inches;
   bonding the polymeric film layer directly to the textile layer; and
   bonding the dead soft metal foil layer directly to the polymeric film layer, wherein the textile layer forms an inner layer of the wrappable textile sleeve and the dead soft metal foil layer forms an outer layer of the wrappable textile sleeve.

6. The method of claim 5 further including providing the polymeric film layer as a preshrunk polymeric film layer.

7. The method of claim 5 further including providing the textile layer as a woven layer.

8. The method of claim 7 further including providing the textile layer having a plurality of discrete circumferentially extending annular bands formed from circumferentially extending weft yarns with adjacent bands having weft yarns with different diameters from one another.

* * * * *